United States Patent
Katole et al.

(10) Patent No.: US 10,429,817 B2
(45) Date of Patent: Oct. 1, 2019

(54) VOICE CONTROL OF COMPONENTS OF A FACILITY

(71) Applicant: Honeywell International Inc., Morris Plains, NJ (US)

(72) Inventors: Atul Laxman Katole, Bangalore (IN); Srinivas Muktevi, Bangalore (IN); Uday Pulleti, Machilipatnam (IN)

(73) Assignee: Honeywell International Inc., Morris Plains, NJ (US)

( * ) Notice: Subject to any disclaimer, the term of this patent is extended or adjusted under 35 U.S.C. 154(b) by 150 days.

(21) Appl. No.: 15/382,982

(22) Filed: Dec. 19, 2016

(65) Prior Publication Data
US 2018/0173195 A1 Jun. 21, 2018

(51) Int. Cl.
| G05B 19/409 | (2006.01) |
| G10L 15/22 | (2006.01) |
| H04L 12/28 | (2006.01) |
| H04L 12/46 | (2006.01) |
| G10L 15/183 | (2013.01) |

(52) U.S. Cl.
CPC .......... G05B 19/409 (2013.01); G10L 15/183 (2013.01); G10L 15/22 (2013.01); H04L 12/282 (2013.01); H04L 12/4625 (2013.01); *G05B 2219/23067* (2013.01); *G05B 2219/2614* (2013.01); *G05B 2219/39441* (2013.01)

(58) Field of Classification Search
CPC ........ G05B 19/409; G05B 2219/39441; G05B 2219/2614; G05B 2219/23067; G10L 15/183; G10L 15/22; H04L 12/4625; H04L 12/282

USPC ................................................ 700/276–286
See application file for complete search history.

(56) References Cited

U.S. PATENT DOCUMENTS

| 7,224,981 B2 | 5/2007 | Deisher et al. |
| 8,831,957 B2 | 9/2014 | Taubman et al. |
| 2006/0293892 A1* | 12/2006 | Pathuel ............... G06F 21/32 704/246 |
| 2010/0332235 A1* | 12/2010 | David ................ G06F 17/2785 704/275 |
| 2014/0039888 A1* | 2/2014 | Taubman .......... H04M 1/72572 704/235 |

(Continued)

FOREIGN PATENT DOCUMENTS

| EP | 1154406 A1 | 11/2001 |
| EP | 2863586 A1 | 4/2015 |

OTHER PUBLICATIONS

The Extended Search Report from related EP Application No. 17202360.8 dated May 7, 2018 (7 pages).

*Primary Examiner* — Ziaul Karim
(74) *Attorney, Agent, or Firm* — Seager, Tufte & Wickhem LLP

(57) ABSTRACT

Devices, methods, and systems for voice control of components of a facility are described herein. One computing device apparatus includes a memory, and a processor configured to execute executable instructions stored in the memory to receive a voice command or voice query from a user, determine location context information associated with the computing device, and determine which component or components of the facility are associated with the voice command or voice query based, at least in part, on the location context information associated with the computing device.

17 Claims, 3 Drawing Sheets

(56) References Cited

U.S. PATENT DOCUMENTS

| | | | |
|---|---|---|---|
| 2014/0225724 A1* | 8/2014 | Rankin | G06F 3/048 |
| | | | 340/438 |
| 2014/0324431 A1 | 10/2014 | Teasley | |
| 2015/0012271 A1* | 1/2015 | Peng | G10L 15/08 |
| | | | 704/235 |
| 2015/0097669 A1* | 4/2015 | Li | G08B 5/222 |
| | | | 340/539.13 |
| 2015/0228279 A1* | 8/2015 | Biadsy | G10L 15/26 |
| | | | 704/235 |
| 2015/0348547 A1 | 12/2015 | Paulik et al. | |
| 2016/0195856 A1* | 7/2016 | Spero | G06N 5/046 |
| | | | 700/90 |
| 2016/0327921 A1* | 11/2016 | Ribbich | F24F 11/30 |
| 2016/0357163 A1* | 12/2016 | Marti | H04W 4/029 |

* cited by examiner

VOICE CONTROL OF COMPONENTS OF A FACILITY

TECHNICAL FIELD

The present disclosure relates to devices, methods, and systems for voice control of components of a facility.

BACKGROUND

Components of a facility (e.g., building), such as, for instance, objects, equipment, and/or devices of a heating, ventilation, and air conditioning (HVAC) system of the facility, may need to be commissioned, maintained, tested, and/or inspected. This is typically performed by one or more users (e.g., technicians and/or workers) in the facility. For example, the user(s) may carry a computing device, such as a laptop, smart phone, or tablet, with him throughout the facility (e.g., to where the components are located in the facility) for use in performing commissioning, maintenance, testing, and/or inspection tasks. However, if the facility is a large facility, such as, for instance, a large commercial building (e.g., airport, mall, office building, etc.), warehouse, or refinery, the commissioning, maintenance, testing, and/or inspection of the components can be time consuming and/or difficult for the user(s).

DETAILED DESCRIPTION

Figure 1:
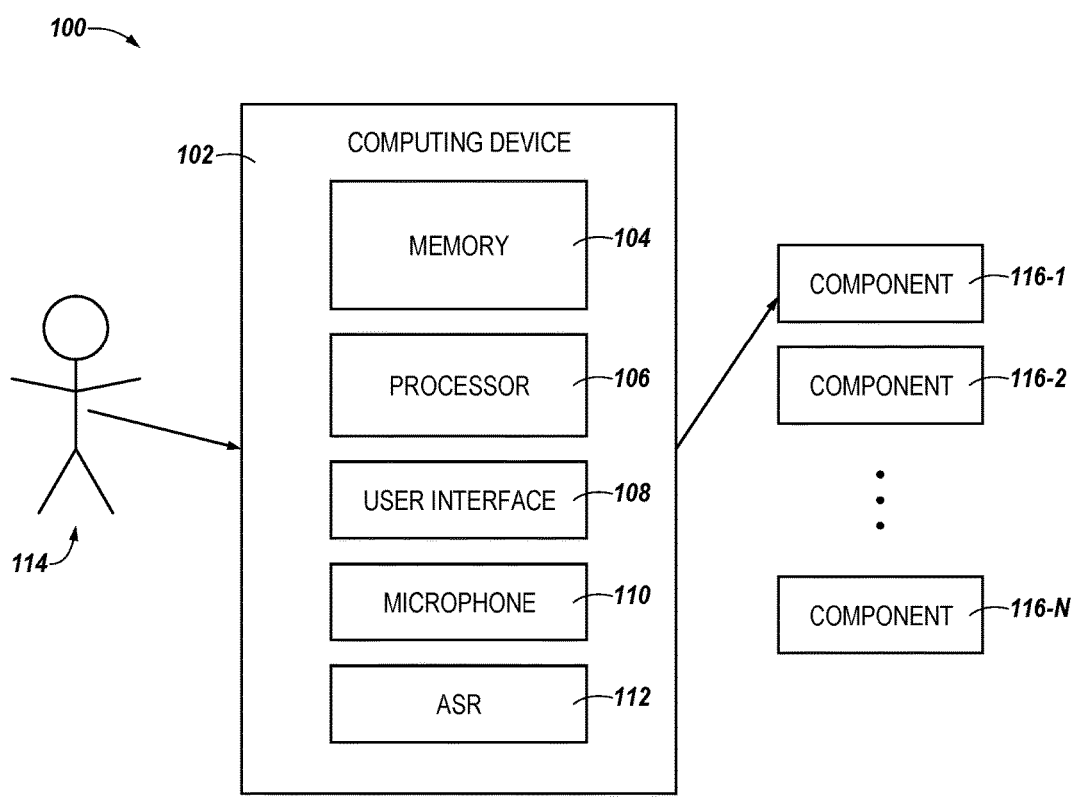
FIG. 1 illustrates an example of a system for controlling components of a facility in accordance with one or more embodiments of the present disclosure.

Devices, methods, and systems for voice control of components of a facility are described herein. For example, one or more embodiments include a memory, and a processor configured to execute executable instructions stored in the memory to receive a voice command or voice query from a user, determine location context information associated with the computing device, and determine which component or components of the facility are associated with the voice command or voice query based, at least in part, on the location context information associated with the computing device.

Utilizing voice control of components of a facility (e.g., building), such as, for instance, objects, equipment, and/or devices of a heating, ventilation, and air conditioning (HVAC) system of the facility, in accordance with one or more embodiments of the present disclosure can make it quicker and/or easier for a user (e.g., technician and/or worker) to commission, maintain, test, and/or inspect the components of the facility, particularly if the facility is a large facility, such as, for instance, a large commercial building (e.g., airport, mall, office building, etc.), warehouse, or refinery. For example, embodiments of the present disclosure can effectively (e.g., quickly and accurately) identify the component or components of the facility to which the user is issuing a voice command or query during the commissioning, maintenance, testing, and/or inspection. Further, embodiments of the present disclosure can effectively (e.g., quickly and/or accurately) recognize the voice command or query issued by the user.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 2, and a similar element may be referenced as 320 in FIG. 3.

As used herein, "a" or "a number of" something can refer to one or more such things. For example, "a number of components" can refer to one or more components. Additionally, the designator "N" as used herein, particularly with respect to reference numerals in the drawings, indicates that a number of the particular feature so designated can be included with a number of embodiments of the present disclosure.

FIG. 1 illustrates an example of a system 100 for controlling components (e.g., components 116-1, 116-2, . . . , 116-N) of a facility in accordance with one or more embodiments of the present disclosure. The facility can be a large facility, such as, for instance, a large commercial building (e.g., airport, mall, office building, etc.), warehouse, or refinery. However, embodiments of the present disclosure are not limited to a particular type of facility or building.

The components of the facility (e.g., components 116-1, 116-2, . . . , 116-N illustrated in FIG. 1) can include, for example, HVAC components of the facility, such as, for instance, thermostats and/or vents of the HVAC system. However, embodiments of the present disclosure are not so limited; components 116-1, 116-2, . . . , 116-N can include any type of object, control component, equipment, device, network, sensor, and/or actuator of the HVAC system such as, for instance, valves such as a heating and/or cooling valves, chillers (e.g., chiller plant), boilers (e.g., boiler plant), pumps such as hot water and/or chilled water pumps, fans, compressors, air dampers such as a variable air volume (VAV) damper, air handling units (AHUs) (e.g., AHU plant), coils such as a heating and/or cooling coil, air filters, and/or cooling towers, among other components. Further, a "component", as used herein, can also include and/or refer to connections between other components, such as a chain of equipment (e.g., duct work, pipes, ventilation, and/or electrical and/or gas distribution equipment) that connects other components of the HVAC system.

As an additional example, components 116-1, 116-2, . . . , 116-N can include lighting components of the facility, such as, for instance, light switches. As an additional example, components 116-1, 116-2, ..., 116-N can include components of a safety and/or security system of the facility, such as, for instance, cameras and/or smoke alarms.

As shown in FIG. 1, system 100 can include a computing device 102. Computing device 102 can be, for example, a laptop computer, a desktop computer, or a mobile device (e.g., smart phone, tablet, PDA, etc.). However, embodiments of the present disclosure are not limited to a particular type of computing device.

Computing device 102 can be used by a user (e.g., user 114 illustrated in FIG. 1) to control (e.g., commission, maintain, test, and/or inspect) components 116-1, 116-2, ..., 116-N of the facility, as will be further described herein. For example, in embodiments in which computing device 102 is a laptop or mobile device, user 114 may carry computing device 102 with him throughout the facility (e.g., to the location of components 116-1, 116-2, ..., 116-N in the facility) for use in performing control tasks on the components. As an additional example, user 114 can control components 116-1, 116-2, ..., 116-N using computing device 102 from a location that is remote from the components, such as, for instance, a control room or operating room elsewhere in the facility or at another location outside the facility. User 114 can be, for instance, a worker, operator, or technician of the HVAC, lighting, safety, and/or security systems of the facility.

As shown in FIG. 1, computing device 102 can include a user interface 108. A user (e.g., user 114) of computing device 102 can interact with computing device 102 via user interface 108. For example, user interface 108 can provide (e.g., display and/or present) information to, and/or receive information from (e.g., input by), the user of computing device 102. For instance, user interface 118 can display information (e.g., data values, operating parameters, readings, statuses, actions, etc.) associated with components 116-1, 116-2, ..., 116-N on which control tasks are being performed.

In some embodiments, user interface 108 can be a graphical user interface (GUI) that can include a display (e.g., a screen) that can provide and/or receive information to and/or from the user of computing device 102. The display can be, for instance, a touch-screen (e.g., the GUI can include touch-screen capabilities). As an additional example, user interface 108 can include a keyboard and/or mouse the user can use to input (e.g., enter) information into computing device 102 (e.g., into user interface 108). Embodiments of the present disclosure, however, are not limited to a particular type(s) of user interface.

As shown in FIG. 1, computing device 102 can include a microphone 110. For example, microphone 110 can be embedded (e.g., built into) computing device 102, as illustrated in FIG. 1. However, embodiments of the present disclosure are not limited. For example, in some embodiments, microphone 110 can be coupled (e.g., connected) to computing device 102 through a wired or wireless connection, such as, for instance, wired or wireless (e.g., Bluetooth and/or Wi-Fi) headphones.

Microphone 110 can receive voice commands and/or voice queries from (e.g., spoken by) user 114. The voice commands and/or voice queries received by microphone 110 can be supplied to automatic speech recognition (ASR) engine 112, which will be further described herein.

The voice commands and/or voice queries may be associated with (e.g., directed to) one or more of components 116-1, 116-2, ..., 116-N. For example, a voice query may include a request for information (e.g., data values, operating parameters, readings, statuses, actions, etc.) from one or more of components 116-1, 116-2, ..., 116-N, and a voice command may include an instruction to one or more of components 116-1, 116-2, ..., 116-N to perform a particular task or function. Further examples of voice commands and voice queries will be further described herein (e.g., in connection with FIGS. 2 and 3).

As shown in FIG. 1, computing device 102 can include a memory 104 and a processor 106. Memory 104 can be any type of storage medium that can be accessed by processor 106 to perform various examples of the present disclosure. For example, memory 104 can be a non-transitory computer readable medium having computer readable instructions (e.g., computer program instructions) stored thereon that are executable by processor 128 to control components of a facility (e.g., components 116-1, 116-2, ..., 116-N) in accordance with the present disclosure. That is, processor 128 can execute the executable instructions stored in memory 126 to control components of a facility (e.g., components 116-1, 116-2, ..., 116-N) in accordance with the present disclosure.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 104 is illustrated as being located in computing device 102, embodiments of the present disclosure are not so limited. For example, memory 104 can also be located internal to another computing resource (e.g., enabling computer readable instructions to be downloaded over the Internet or another wired or wireless connection).

As shown in FIG. 1, computing device 102 can include an automatic speech recognition (ASR) engine 112. For example, ASR engine 112 can be embedded (e.g., built into) computing device 102, as illustrated in FIG. 1. However, embodiments of the present disclosure are not so limited. For example, in some embodiments, ASR engine 112 can be coupled (e.g., connected) to computing device 102 through a wired or wireless connection. ASR engine 112 can be a device agnostic ASR engine.

ASR engine 112 can receive (e.g., via microphone 110) a voice command or voice query from (e.g., spoken by) user 114. Upon receiving the voice command or voice query, ASR engine can utilize location context information associated with computing device 102 to determine (e.g., identify) which of components 116-1, 116-2, ..., 116-N the command or query is associated with the command or query (e.g., which component(s) the command or query is directed to), and/or to recognize the command or query.

For example, upon receiving a voice command or voice query from user 114, ASR engine 112 can determine location context information associated with computing device 102. In some embodiments, (e.g., embodiments in which computing device 102 is a laptop or mobile device and user 114 is carrying computing device 102 with him throughout the facility), the location context information associated with computing device 102 can include, for example, the position of computing device 102 in the facility (which can correspond to the position of user 114 in the facility) and/or the direction in which user 114 is facing. ASR engine 102 can determine the location context information (e.g., the position of computing device 102 in the facility) using, for example, indoor and/or outdoor positioning technology associated with computing device 102, such as GPS, fingerprinting, and/or multilateration, among others.

In some embodiments, (e.g., embodiments in which user 114 is using computing device 102 at a location that is remote from components 116-1, 116-2, . . . , 116-N), the location context information can include the position of one or more of the components in the facility and/or the position of another user in the facility, such as, for instance, the position of a user who is making a complaint about the HVAC, lighting, safety, and/or security systems of the facility. In such embodiments, ASR engine 102 can receive the location context information (e.g., the position of the component(s) and/or user in the facility) from user 114 via user interface 108. For instance, user 114 may input (e.g., enter) the location context information into user interface 108.

In some embodiments (e.g., embodiments in which computing device 102 is a laptop or mobile device and user 114 is carrying computing device 102 with him throughout the facility), the location context information associated with computing device 102 can include which component or components of components 116-1, 116-2, . . . , 116-N are located within a particular proximity of (e.g., are closest to) computing device 120. In such embodiments, ASR engine 112 can determine the location context information (e.g., which component(s) are located within the particular proximity of computing device 120) using a map of the facility stored in ASR engine 112 that includes the positions of components 116-1, 116-2, . . . , 116-N in the facility, along with the position of computing device 102 in the facility. For instance, the map can be dynamically updated based on (e.g., to reflect) updates to the position of computing device 102 as user 114 moves throughout the facility. The map can be pre-loaded to computing device 102, or can be dynamically downloaded by computing device 102 during operation. Examples of such maps will be further described herein (e.g., in connection with FIGS. 2 and 3).

ASR engine 112 can then determine (e.g., identify) which component or components of components 116-1, 116-2, . . . , 116-N are associated with the voice command or voice query from user 114 based, at least in part, on the location context information associated with computing device 102. For instance, in the example illustrated in FIG. 1, the location context information may indicate that component 116-1 is closest to computing device 102, and ASR engine 112 can determine component 116-1 is associated with the voice command or voice query based on that information.

As such, ASR engine 112 can determine which component(s) of the facility are associated with the voice command or voice query without user 114 having to explicitly identify that component(s) in the command or query. This can make it quicker and/or easier for user 114 to perform commissioning, maintenance, testing, and/or inspection tasks in the facility.

ASR engine 112 can also recognize the voice command or voice query from user 114 based, at least in part, on the location context information associated with computing device 102. For example, ASR engine 112 can search for the voice command or voice query in a command and/or query search (e.g., speech knowledge) space in ASR engine 112 based on the location context information. For instance, ASR engine 112 may search only for commands or queries in the search space that are applicable to the component or components of components 116-1, 116-2, . . . , 116-N that are located within a particular proximity of (e.g., are closest to) computing device 120.

As such, ASR engine 112 can locate the voice command or voice query from user 114 in the search space without having to search through all commands and/or queries in the search space. Accordingly, ASR engine 112 can more effectively (e.g., quicker and/or more accurately) recognize the voice command or voice query issued by the user.

The command and/or query search space can include weighted finite space transducers (WFSTs) that can provide posterior probability information for senones in the speech signal associated with the voice command or voice query from the user, and the search for the probable word hypothesis can be conducting on the WFSTs using search algorithms. Further, the WFSTs can be dynamically updated based on (e.g., to reflect updates to) the location context information associated with computing device 120. For example, the WFSTs can include flexible HMM context-lexicon-grammar (HCLG) based lexicon and grammar components that can be dynamically updated based on the location context information. For instance, the WFSTs can encode HCLG-based graphs that represent speech knowledge and can be dynamically updated based on which component(s) are located within the particular proximity of computing device 120. Such dynamic updates can further enhance the effectiveness of the ASR engine's recognition of the voice command or query.

Further, in some embodiments, ASR engine 112 can determine which component or components of components 116-1, 116-2, . . . , 116-N are associated with the voice command or voice query from user 114 based, at least in part, on the recognized voice command or voice query. That is, ASR engine 112 can determine which component(s) are associated with the voice command or voice query based, at least in part, on the command or query itself. For instance, ASR engine 112 can determine which component(s) are associated with the voice command and/or query based, at least in part, on the words and/or phrases included in the command or query.

Upon ASR engine 112 recognizing the voice command or voice query received from user 114, computing device 102 can send (e.g., transmit) the recognized command or query to the component or components of components 116-1, 116-2, . . . , 116-N determined (e.g., identified) by ASR engine 112 to be associated with the command or query For instance, in the example illustrated in FIG. 1 (e.g., in which component 116-1 has been determined to be the component associated with the command or query), computing device 102 can send the recognized command or query to component 116-1. The identified component(s) (e.g., component 116-1 in the example illustrated in FIG. 1) can then process and execute the command or query upon receiving the command or query.

Computing device 102 can send the recognized voice command or voice query to component 116-1, for example, via a wired or wireless network (not shown in FIG. 1 for clarity and so as not to obscure embodiments of the present disclosure). The network can be, for example, a network relationship through which computing device 102 and components 116-1, 116-2, . . . , 116-N can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive the recognized voice command or voice query via a wired or wireless network, and transmit the received command or query to component 116-1 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Figure 2:
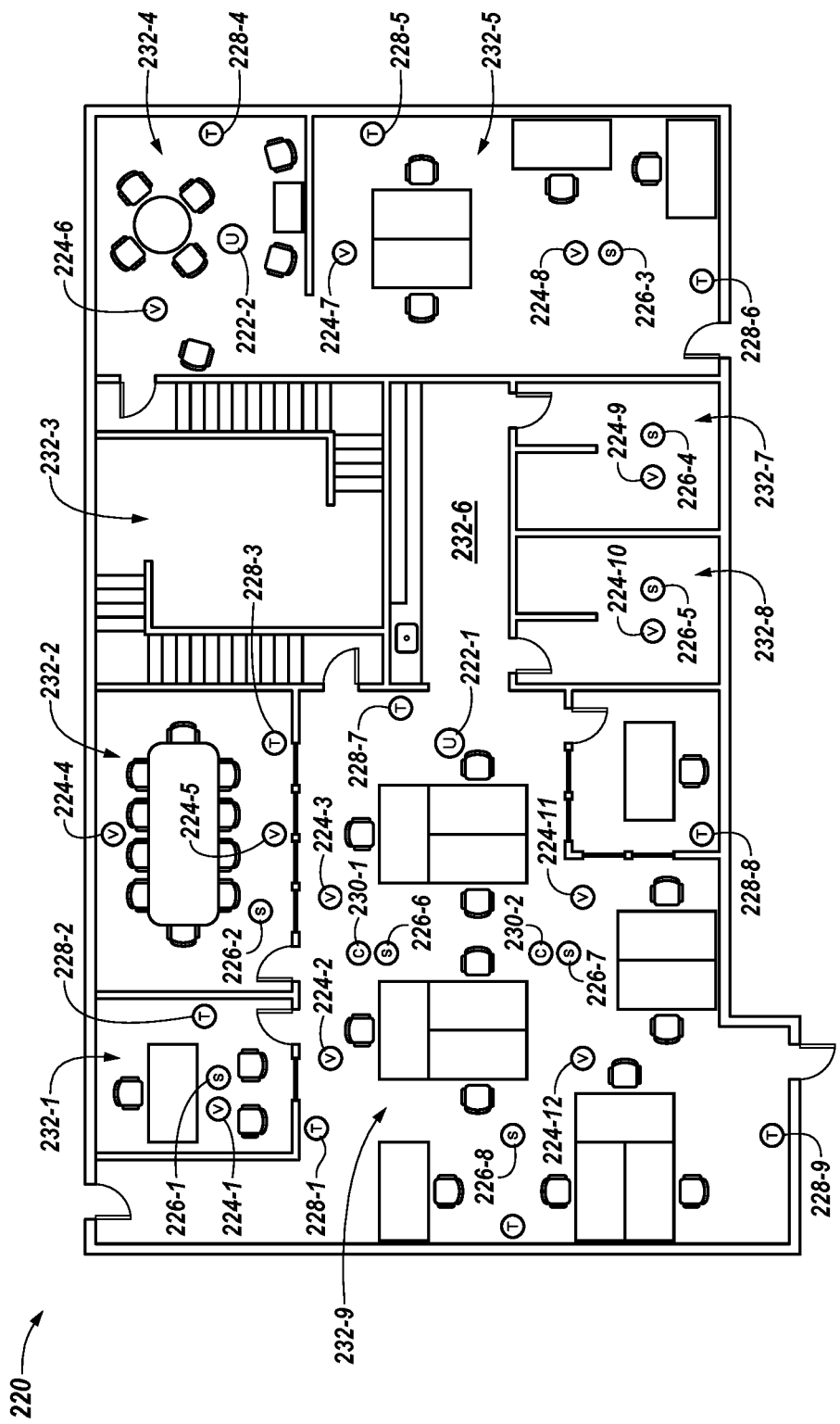
FIG. 2 illustrates a visual representation of a map of a facility in accordance with one or more embodiments of the present disclosure.

FIG. 2 illustrates a visual representation of a map 220 of a facility in accordance with one or more embodiments of the present disclosure. In the example illustrated in FIG. 2, map 220 is a map of a floor of the facility. Map 220 can be stored in ASR engine 112 previously described in connection with FIG. 1.

As shown in FIG. 2, map 220 includes (e.g., illustrates) the positions of various components in the floor of the facility, such as HVAC vents 224-1, 224-2, 224-3, 224-4, 224-5, 224-6, 224-7, 224-8, 224-9, 224-10, 224-11, and 224-12 (which may be collectively referred to as HVAC vents 224), smoke alarms 226-1, 226-2, 226-3, 226-4, 226-5, 226-7, and 226-8 (which may be collectively referred to as smoke alarms 226), thermostats 228-1, 228-2, 228-3, 228-4, 228-5, 228-6, 228-7, 228-8, and 228-9 (which may be collectively referred to as thermostats 228), and cameras 230-1 and 230-2 (which may be collectively referred to as cameras 230). For instance, HVAC vent 224-1, smoke alarm 226-1, and thermostat 228-2 are located in space 232-1 of the floor of the facility, HVAC vents 224-4 and 224-5, smoke alarm 226-2, and thermostat 228-3 are located in space 232-2 of the floor of the facility, and the other HVAC vents 224, smoke alarms 226, thermostats 228, and cameras 230 are located in the other respective spaces 232-3, 232-4, 232-5, 232-6, 232-7, 232-8, and 232-9 of the floor of the facility, as illustrated in FIG. 2.

As shown in FIG. 2, map 220 also includes (e.g., illustrates) the positions (e.g., current positions) of users 222-1 and 222-2 in the floor of the facility. For instance, user 222-1 is located on the right side of space 232-9, and user 222-2 is located in space 232-4, as illustrated in FIG. 2.

Users 222-1 and 222-2 may each be carrying a computing device analogous to computing device 102 previously described in connection with FIG. 1. For instance, the computing device being carried by each respective user 222-1 and 222-2 may include an ASR engine analogous to ASR engine 112 previously described in connection with FIG. 1. As such, the computing device being carried by each respective user 222-1 and 222-2 can determine location context information associated therewith, such as, for instance, its position in the floor of the facility, as previously described in connection with FIG. 1. The position of the computing device being carried by user 222-1 can correspond to the position of user 222-1 in the facility, and the position of the computing device being carried by user 222-2 can correspond to the position of user 222-2 in the facility, and these positions can be included in map 220, as illustrated in FIG. 2. Further, as users 222-1 and 222-2 move throughout the floor of the facility, their respective positions in map 220 can be dynamically updated to reflect their respective movements, as previously described in connection with FIG. 1.

In the example illustrated in FIG. 2, users 222-1 and 222-2 may be HVAC technicians who have been called to the facility in response to complaints about the temperature in the facility. While at their respective locations illustrated in FIG. 2, users 222-1 and 222-2 may issue a voice query to get the temperature in their respective vicinities. Based on the location context information provided by map 220, the computing device being carried by user 222-1 can determine that thermostat 228-7 is the closest thermostat to user 222-1 in the facility, and therefore can determine that the query issued (e.g., spoken) by user 222-1 is associated with (e.g., directed to) thermostat 228-7 (e.g., without user 222-1 having to specifically identify thermostat 228-7 in the query). Similarly, the computing device being carried by user 222-2 can determine that thermostat 228-4 is the closest thermostat to user 222-2 in the facility, and therefore can determine that the query issued by user 222-2 is associated with thermostat 228-4, based on the location context information provided by map 220 (e.g., without user 222-2 having to specifically identify thermostat 228-4 in the query).

Accordingly, the computing device being carried by user 222-1 can send the temperature query to thermostat 228-7, and the computing device being carried by user 222-2 can send the temperature query to thermostat 228-4. Thermostats 228-7 and 228-4 can reply to the respective queries by sending the respective computing devices their respective temperature readings, which can be provided (e.g., displayed) to users 222-1 and 222-2 (e.g., the temperature reading of thermostat 228-7 is provided to user 222-1, and the temperature reading of thermostat 228-4 is provided to user 222-2).

Continuing in the example, users 222-1 and 222-2 may also issue a voice query to get the status of the HVAC vents at their respective locations illustrated in FIG. 2. Based on the location context information provided by map 220, the computing device being carried by user 222-1 can determine that HVAC vents 224-3 and 224-11 are the closest vents to user 222-1 in the facility, and therefore can determine that the query issued (e.g., spoken) by user 222-1 is associated with (e.g., directed to) vents 224-3 and 224-11 (e.g., without user 222-1 having to specifically identify vents 224-3 and 224-11). Similarly, the computing device being carried by user 222-2 can determine that HVAC vent 224-6 is the closest vent to user 222-2 in the facility, and therefore can determine that the query issued by user 222-2 is associated with vent 224-6, based on the location context information provided by map 220 (e.g., without user 222-2 having to specifically identify vent 224-6).

Accordingly, the computing device being carried by user 222-1 can send the vent status query to HVAC vents 224-3 and 224-11, and the computing device being carried by user 222-2 can send the vent status query to HVAC vent 224-6. Vents 224-3, 224-11, and 224-6 can reply to the respective queries by sending the respective computing devices their respective statuses, which can be provided (e.g., displayed) to users 222-1 and 222-2 (e.g., the statuses of vents 224-3 and 224-11 are provided to user 222-1, and the status of vent 224-6 is provided to user 222-2).

If users 222-1 and 222-2 determine that the complaints about the temperature are due to the status of the vents, such as, for instance, a high airflow through the vents, users 222-1 and 222-2 can issue a voice command to regulate all vents to reduce airflow in their respective vicinities. Based on the location information context provided by map 220, the computing device being carried by user 222-1 can determine that the command from user 222-1 is associated with vents 224-3 and 224-11, and accordingly can send the command to vents 224-3 and 224-11. Similarly, the computing device being carried by user 222-2 can determine that the command from user 222-1 is associated with vent 224-6, and accordingly can send the command to vent 224-6. Upon receiving the respective commands, vents 224-3, 224-11, and 224-6 can reduce their airflow.

Further, the location context information provided by map 220 may indicate that while there are several components (e.g., HVAC vents 224-3 and 224-11, smoke alarms 226-6 and 226-7, thermostat 228-7, and cameras 230-1 and 230-2) in the vicinity of user 222-1, the only components in the vicinity of user 222-1 are HVAC vent 224-6 and thermostat 228-4. As such, the computing device being carried by user 222-2 can recognize the voice queries and voice command issued by user 222-2 by only searching the search space (e.g., WFSTs) of its ASR engine for queries and commands applicable to HVAC vents and thermostats, while the computing device being carried by user 222-1 may need to search its search space for queries and commands applicable to smoke alarms and cameras, as well as HVAC vents and thermostats, to recognize the voice queries and command issued by user 222-1.

Figure 3:
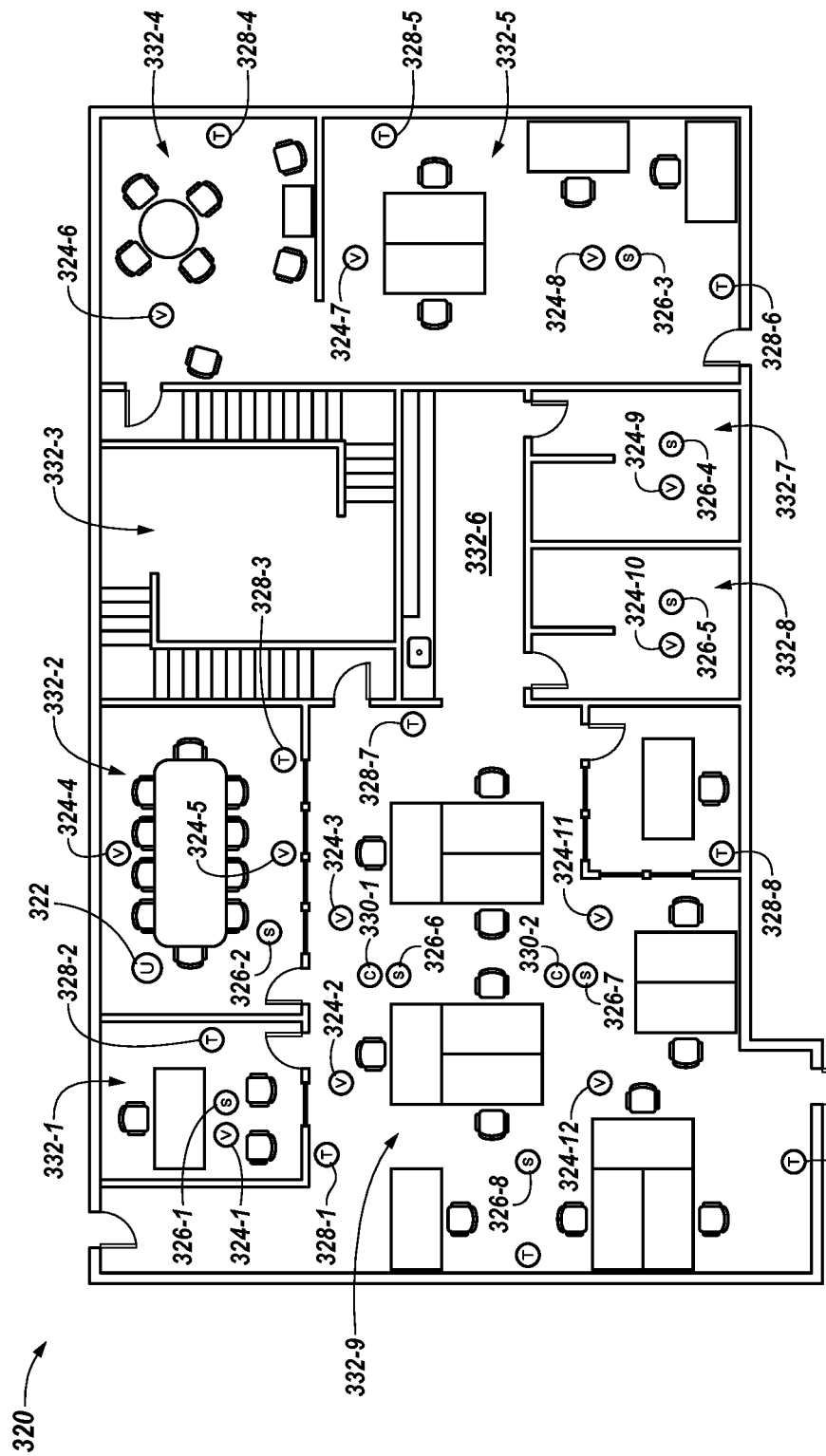
FIG. 3 illustrates a visual representation of a map of a facility in accordance with one or more embodiments of the present disclosure.

FIG. 3 illustrates a visual representation of a map 320 of a facility in accordance with one or more embodiments of the present disclosure. Map 220 can be analogous to map 220 previously described in connection with FIG. 2. For example, map 320 includes the positions of HVAC vents 324, smoke alarms 326, thermostats 328, and cameras 330 in spaces 332 of a floor of the facility, in a manner analogous to that previously described in connection with FIG. 2.

As shown in FIG. 3, map 320 also includes (e.g., illustrates) the position (e.g., current positions) of user 322 in the floor of the facility. For instance, user 322 is located in space 332-2, as illustrated in FIG. 3. User 322 may be carrying a computing device analogous to computing device 102 previously described in connection with FIG. 1. For instance, the computing device being carried by user 322 may include an ASR engine analogous to ASR engine 112 previously described in connection with FIG. 1. As such, the computing device being carried by user 322 can determine location context information associated therewith, such as, for instance, its position in the floor of the facility, as previously described in connection with FIG. 1. The position of the computing device being carried by user 322 can correspond to the position of user 322 in the facility, as illustrated in FIG. 3. Further, as user 322 moves throughout the floor of the facility, his/her position in map 320 can be dynamically updated to reflect his/her movements, as previously described in connection with FIG. 1.

While at his/her location illustrated in FIG. 3, user 322 may issue a voice command to "turn on the light". Based on the location context information provided by map 320, the computing device being carried by user 322 can determine that user 322 is located in space 332-2 in the facility, and therefore can determine that the command is associated with the lighting components of space 332-2 (e.g., without user 322 having to specifically identify space 332-2 in the command). Accordingly, the computing device can send the command to the lighting components of space 332-2, and the lighting components of space 332-2 can turn on upon receiving the command.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for controlling components of a facility, comprising:
  a memory; and
  a processor configured to execute executable instructions stored in the memory to:
    receive a voice command or voice query from a user;
    determine location context information associated with the computing device using a map of the facility stored in the computing device, wherein the map includes:
      positions of the components in the facility, wherein the components of the facility are one or more of a heating, ventilation, and/or air conditioning (HVAC) component of the facility, a lighting component of the facility, a safety component of the facility, and/or a security component of the facility; and
      a position of the computing device in the facility at a time of receiving the voice command or voice query;
    determine which component or components of the facility are associated with the voice command or voice query based, at least in part, on the position of the computing device in the facility at the time of receiving the voice command or voice query and the positions of the components in the facility;
    send a command that corresponds to the voice command or voice query to at least one of modify, query and control the component or components of the facility determined to be associated with the voice command or voice query; and wherein once received, the component or components determined to be associated with the voice command or voice query implement the received command.

2. The computing device of claim 1, wherein the processor is configured to execute the executable instructions to recognize the voice command or voice query based, at least in part, on the location context information associated with the computing device.

3. The computing device of claim 1, wherein the processor is configured to execute the executable instructions to determine the location context information associated with the computing device using positioning technology associated with the computing device.

4. The computing device of claim 1, wherein the location context information associated with the computing device includes a direction in which the user is facing.

5. The computing device of claim 1, wherein the computing device is a mobile device.

6. The computing device of claim 1, wherein the command is a commissioning command, a maintenance command, a testing command, an inspection command and/or a control command.

7. A method for controlling components of a facility, comprising:
  receiving, by a computing device, a voice command or voice query from a user;
  determining, by the computing device, location context information associated with the computing device upon receiving the voice command or voice query, the location context information associated with the computing device is determined using a map of the facility stored in the computing device, wherein the map includes:
    positions of the components in the facility, wherein the components of the facility include one or more of a heating, ventilation, and/or air conditioning (HVAC) component of the facility, a lighting component of the facility, a safety component of the facility, and/or a security component of the facility; and
    a position of the computing device in the facility at a time of receiving the voice command or voice query;
  recognizing, by the computing device, the voice command or voice query based, at least in part, on the position of the computing device in the facility at the time of receiving the voice command or voice query and the positions of the components in the facility;
  sending a command that corresponds to the recognized voice command or voice query to at least one of modify, query and control one or more identified component or components of the facility that are identified based on the recognized voice command or voice query; and
  executing the command to thereby at least one of modify, query and control the one or more identified component or components of the facility.

8. The method of claim 7, wherein the location context information associated with the computing device includes which component or components of the facility located within a particular proximity of the computing device.

9. The method of claim 7, wherein recognizing the voice command or voice query based, at least in part, on the position of the computing device in the facility at the time of receiving the voice command or voice query includes searching for the voice command or voice query in a command or query search space based at least in part on the position of the computing device in the facility.

10. The method of claim 9, wherein searching for the voice command or voice query in the command or query search space includes searching only for commands or queries in the search space that are applicable to components of the facility located within a particular proximity of the position of the computing device in the facility at the time of receiving the voice command or voice query.

11. The method of claim 9, wherein the search space includes weighted finite space transducers that are updated based on the position of the computing device in the facility.

12. The method of claim 9, wherein the search space includes lexicon and grammar components that are updated based on the position of the computing device in the facility.

13. The method of claim 9, wherein the method includes:
  receiving the voice command or voice query using a microphone of the computing device;
  determining the location context information associated with the computing device using an automatic speech recognition engine of the computing device; and
  recognizing the voice command or voice query using the automatic speech recognition engine of the computing device.

14. A non-transitory computer readable medium having computer readable instructions stored thereon that are executable by a processor to:
  receive a voice command or voice query from a user of a computing device;
  determine location context information associated with the computing device using a map of a facility stored in the computing device, wherein the map includes:
    positions of components of the facility in the facility, wherein the components of the facility include one or more of a heating, ventilation, and/or air conditioning (HVAC) component of the facility, a lighting component of the facility, a safety component of the facility, and/or a security component of the facility; and
    a position of the computing device in the facility at a time of receiving the voice command or voice query;
  recognize the voice command or voice query based, at least in part, on the position of the computing device in the facility at the time of receiving the voice command or voice query;
  determine which component or components of the facility are associated with the recognized voice command or voice query based, at least in part, on the position of the computing device in the facility at the time of receiving the voice command or voice query and the positions of the components in the facility;
  send a command that corresponds to the recognized voice command or voice query to the component or components of the facility determined to be associated with the recognized voice command or voice query; and
  wherein once received, the component or components of the facility determined to be associated with the recognized voice command or voice query implement the received command.

15. The computer readable medium of claim 14, wherein the instructions are executable by the processor to determine which component or components of the facility are associated with the recognized voice command or voice query based, at least in part, on the recognized voice command or voice query.

16. The computer readable medium of claim 14, wherein the instructions are executable by the processor to determine which component or components of the facility are associated with the recognized voice command or voice query without the user identifying the component or components in the voice command or voice query.

17. The computer readable medium of claim 14, wherein the component or components of the facility include a heating, ventilation, and air conditioning (HVAC) component of the facility and/or a lighting component of the facility.

\* \* \* \* \*